United States Patent
Eliaz

(10) Patent No.: US 9,252,822 B2
(45) Date of Patent: Feb. 2, 2016

(54) ADAPTIVE NON-LINEAR MODEL FOR HIGHLY-SPECTRALLY-EFFICIENT COMMUNICATIONS

(71) Applicant: MagnaCom Ltd., Moshav Ben Shemen (IL)

(72) Inventor: Amir Eliaz, Moshav Ben Shemen (IL)

(73) Assignee: MagnaCom Ltd. (IL)

(*) Notice: Subject to any disclaimer, the term of this patent is extended or adjusted under 35 U.S.C. 154(b) by 0 days.

(21) Appl. No.: 14/472,559

(22) Filed: Aug. 29, 2014

(65) Prior Publication Data

US 2015/0055722 A1 Feb. 26, 2015

Related U.S. Application Data

(63) Continuation of application No. 14/047,328, filed on Oct. 7, 2013, now Pat. No. 8,824,611, which is a continuation of application No. 13/755,050, filed on Jan. 31, 2013, now Pat. No. 8,553,821.

(Continued)

(51) Int. Cl.
*H04B 1/04* (2006.01)
*H04B 1/10* (2006.01)
(Continued)

(52) U.S. Cl.
CPC .............. *H04B 1/0475* (2013.01); *G06F 11/10* (2013.01); *H04B 1/10* (2013.01); *H04B 1/16* (2013.01);
(Continued)

(58) Field of Classification Search
CPC .... A01B 12/006; H04L 27/38; H04B 17/008; H04B 2001/0416; H04B 1/00; H04B 1/0003; H04B 1/005; H04B 1/0458; H04B 1/72; H04B 3/04–3/18; H04B 1/0475; H04B 1/62–1/64
See application file for complete search history.

(56) References Cited

U.S. PATENT DOCUMENTS

| 4,109,101 A | 8/1978 | Mitani |
| 4,135,057 A | 1/1979 | Bayless, Sr. et al. |

(Continued)

FOREIGN PATENT DOCUMENTS

| EP | 1865677 A1 | 12/2007 |
| EP | 1928141 A2 | 4/2008 |

(Continued)

OTHER PUBLICATIONS

Equalization: The Correction and Analysis of Degraded Signals, White Paper, Agilent Technologies, Ransom Stephens V1.0, Aug. 15, 2005 (12 pages).

(Continued)

*Primary Examiner* — Dac Ha
(74) *Attorney, Agent, or Firm* — McAndrews, Held & Malloy, Ltd.

(57) ABSTRACT

A receiver may be operable to generate estimates of transmitted symbols using a sequence estimation process that may incorporate a non-linear model. The non-linear model may be adapted by the receiver based on particular communication information that may be indicative of non-linearity experienced by the transmitted symbols. The receiver may generate a reconstructed signal from the estimates of the transmitted symbols. The receiver may adapt the non-linear model based on values of an error signal generated from the reconstructed signal, and the values of the error signal may be generated from a portion of the generated estimates that may correspond to known symbols and/or information symbols. The values of the error signal corresponding to the known symbols may be given more weight in an adaptation algorithm, and the values of the error signal corresponding to the information symbols may be given less weight in the adaptation algorithm.

19 Claims, 6 Drawing Sheets

Related U.S. Application Data

(60) Provisional application No. 61/662,085, filed on Jun. 20, 2012, provisional application No. 61/726,099, filed on Nov. 14, 2012, provisional application No. 61/729,774, filed on Nov. 26, 2012, provisional application No. 61/747,132, filed on Dec. 28, 2012.

(51) Int. Cl.

| | | |
|---|---|---|
| *H04L 23/02* | (2006.01) | |
| *H04L 27/04* | (2006.01) | |
| *H04L 27/00* | (2006.01) | |
| *H04L 27/02* | (2006.01) | |
| *H04L 25/03* | (2006.01) | |
| *H04L 27/01* | (2006.01) | |
| *H04L 27/36* | (2006.01) | |
| *H04L 7/00* | (2006.01) | |
| *G06F 11/10* | (2006.01) | |
| *H04B 1/16* | (2006.01) | |
| *H04L 1/20* | (2006.01) | |
| *H04B 1/709* | (2011.01) | |
| *H04L 25/08* | (2006.01) | |
| *H04L 1/00* | (2006.01) | |
| *H04L 25/02* | (2006.01) | |
| *H04L 27/38* | (2006.01) | |
| *H04B 17/00* | (2015.01) | |
| *H04L 7/02* | (2006.01) | |
| *H04B 17/15* | (2015.01) | |

(52) U.S. Cl.
CPC .............. *H04B 1/709* (2013.01); *H04B 17/008* (2013.01); *H04B 17/15* (2015.01); *H04L 1/005* (2013.01); *H04L 1/0036* (2013.01); *H04L 1/0048* (2013.01); *H04L 1/0054* (2013.01); *H04L 1/203* (2013.01); *H04L 1/206* (2013.01); *H04L 7/0058* (2013.01); *H04L 7/0087* (2013.01); *H04L 7/02* (2013.01); *H04L 23/02* (2013.01); *H04L 25/0236* (2013.01); *H04L 25/03006* (2013.01); *H04L 25/0328* (2013.01); *H04L 25/03038* (2013.01); *H04L 25/03057* (2013.01); *H04L 25/03178* (2013.01); *H04L 25/03197* (2013.01); *H04L 25/03267* (2013.01); *H04L 25/03305* (2013.01); *H04L 25/03318* (2013.01); *H04L 25/03337* (2013.01); *H04L 25/03343* (2013.01); *H04L 25/03834* (2013.01); *H04L 25/03885* (2013.01); *H04L 25/03949* (2013.01); *H04L 25/08* (2013.01); *H04L 27/00* (2013.01); *H04L 27/01* (2013.01); *H04L 27/02* (2013.01); *H04L 27/04* (2013.01); *H04L 27/36* (2013.01); *H04L 27/366* (2013.01); *H04L 27/368* (2013.01); *H04L 27/38* (2013.01); *H04B 2001/0416* (2013.01)

(56) References Cited

U.S. PATENT DOCUMENTS

| | | | |
|---|---|---|---|
| 4,797,925 A | 1/1989 | Lin | |
| 5,111,484 A | 5/1992 | Karabinis | |
| 5,131,011 A | 7/1992 | Bergmans et al. | |
| 5,202,903 A | 4/1993 | Okanoue | |
| 5,249,200 A | 9/1993 | Chen et al. | |
| 5,283,813 A | 2/1994 | Shalvi et al. | |
| 5,291,516 A | 3/1994 | Dixon et al. | |
| 5,394,439 A | 2/1995 | Hemmati | |
| 5,432,822 A | 7/1995 | Kaewell, Jr. | |
| 5,459,762 A | 10/1995 | Wang et al. | |
| 5,590,121 A | 12/1996 | Geigel et al. | |
| 5,602,507 A | 2/1997 | Suzuki | |
| 5,710,792 A | 1/1998 | Fukawa | |
| 5,757,855 A | 5/1998 | Strolle et al. | |
| 5,784,415 A | 7/1998 | Chevillat et al. | |
| 5,818,653 A | 10/1998 | Park et al. | |
| 5,886,748 A | 3/1999 | Lee | |
| 5,889,823 A | 3/1999 | Agazzi et al. | |
| 5,915,213 A | 6/1999 | Iwatsuki et al. | |
| 5,930,309 A | 7/1999 | Knutson et al. | |
| 5,946,359 A | 8/1999 | Tajiri | |
| 6,009,120 A | 12/1999 | Nobakht | |
| 6,167,079 A | 12/2000 | Kinnunen et al. | |
| 6,233,709 B1 | 5/2001 | Zhang et al. | |
| 6,272,173 B1 | 8/2001 | Hatamian | |
| 6,335,954 B1 | 1/2002 | Bottomley et al. | |
| 6,356,586 B1 | 3/2002 | Krishnamoorthy et al. | |
| 6,516,025 B1 | 2/2003 | Warke et al. | |
| 6,516,437 B1 | 2/2003 | Van Stralen et al. | |
| 6,529,303 B1 | 3/2003 | Rowan | |
| 6,532,256 B2 | 3/2003 | Miller | |
| 6,535,549 B1 | 3/2003 | Scott et al. | |
| 6,591,090 B1 | 7/2003 | Vuorio et al. | |
| 6,608,873 B1 | 8/2003 | Spinnler | |
| 6,675,184 B1 | 1/2004 | Matsui | |
| 6,690,754 B1 | 2/2004 | Haratsch et al. | |
| 6,697,441 B1 | 2/2004 | Bottomley et al. | |
| 6,718,165 B1 * | 4/2004 | Ha | 455/234.2 |
| 6,785,342 B1 | 8/2004 | Isaksen et al. | |
| 6,871,208 B1 | 3/2005 | Guo et al. | |
| 6,968,021 B1 | 11/2005 | White et al. | |
| 6,985,709 B2 | 1/2006 | Perets | |
| 7,158,324 B2 | 1/2007 | Stein et al. | |
| 7,190,288 B2 | 3/2007 | Robinson et al. | |
| 7,190,721 B2 | 3/2007 | Garrett | |
| 7,205,798 B1 | 4/2007 | Agarwal et al. | |
| 7,206,363 B2 | 4/2007 | Hegde et al. | |
| 7,215,716 B1 | 5/2007 | Smith | |
| 7,269,205 B2 | 9/2007 | Wang | |
| 7,336,716 B2 | 2/2008 | Maltsev et al. | |
| 7,463,697 B2 | 12/2008 | Maltsev et al. | |
| 7,467,338 B2 | 12/2008 | Saul | |
| 7,583,755 B2 | 9/2009 | Ma et al. | |
| 7,830,854 B1 | 11/2010 | Sarkar et al. | |
| 7,924,956 B2 | 4/2011 | Maltsev et al. | |
| 7,974,230 B1 | 7/2011 | Talley et al. | |
| 8,005,170 B2 | 8/2011 | Lee et al. | |
| 8,059,737 B2 | 11/2011 | Yang | |
| 8,175,186 B1 | 5/2012 | Wiss et al. | |
| 8,199,804 B1 | 6/2012 | Cheong | |
| 8,248,975 B2 | 8/2012 | Fujita et al. | |
| 8,265,561 B2 | 9/2012 | Nakamura | |
| 8,331,500 B2 | 12/2012 | Choi | |
| 8,351,536 B2 | 1/2013 | Mazet et al. | |
| 8,422,589 B2 | 4/2013 | Golitschek Edler Von Elbwart et al. | |
| 8,427,935 B2 | 4/2013 | Van de Beek et al. | |
| 8,432,987 B2 | 4/2013 | Siti et al. | |
| 8,498,591 B1 | 7/2013 | Qian et al. | |
| 8,526,523 B1 | 9/2013 | Eliaz | |
| 8,548,072 B1 | 10/2013 | Eliaz | |
| 8,548,089 B2 | 10/2013 | Agazzi et al. | |
| 8,548,097 B1 | 10/2013 | Eliaz | |
| 8,553,821 B1 | 10/2013 | Eliaz | |
| 8,559,494 B1 | 10/2013 | Eliaz | |
| 8,559,496 B1 | 10/2013 | Eliaz | |
| 8,559,498 B1 | 10/2013 | Eliaz | |
| 8,565,363 B1 | 10/2013 | Eliaz | |
| 8,566,687 B1 | 10/2013 | Eliaz | |
| 8,571,131 B1 | 10/2013 | Eliaz | |
| 8,571,146 B1 | 10/2013 | Eliaz | |
| 8,572,458 B1 | 10/2013 | Eliaz | |
| 8,582,637 B1 | 11/2013 | Eliaz | |
| 8,599,914 B1 | 12/2013 | Eliaz | |
| 8,605,832 B1 | 12/2013 | Eliaz | |
| 8,665,941 B1 | 3/2014 | Eliaz | |
| 8,665,992 B1 | 3/2014 | Eliaz | |
| 8,666,000 B2 | 3/2014 | Eliaz | |
| 8,675,769 B1 | 3/2014 | Eliaz | |
| 8,675,782 B2 | 3/2014 | Eliaz | |
| 8,681,889 B2 | 3/2014 | Eliaz | |
| 8,731,413 B1 | 5/2014 | Dave et al. | |

(56) References Cited

U.S. PATENT DOCUMENTS

| | | |
|---|---|---|
| 8,737,458 B2 | 5/2014 | Eliaz |
| 8,744,003 B2 | 6/2014 | Eliaz |
| 8,744,009 B2 | 6/2014 | Kleider et al. |
| 8,774,738 B2 | 7/2014 | Dakshinamurthy et al. |
| 8,781,008 B2 | 7/2014 | Eliaz |
| 8,804,879 B1 | 8/2014 | Eliaz |
| 8,811,548 B2 | 8/2014 | Eliaz |
| 8,824,572 B2 | 9/2014 | Eliaz |
| 8,824,599 B1 | 9/2014 | Eliaz |
| 8,824,611 B2 | 9/2014 | Eliaz |
| 8,831,124 B2 | 9/2014 | Eliaz |
| 8,842,778 B2 | 9/2014 | Eliaz |
| 8,873,612 B1 | 10/2014 | Eliaz |
| 8,885,698 B2 | 11/2014 | Eliaz |
| 8,885,786 B2 | 11/2014 | Eliaz |
| 8,891,701 B1 | 11/2014 | Eliaz |
| 8,897,387 B1 | 11/2014 | Eliaz |
| 8,897,405 B2 | 11/2014 | Eliaz |
| 8,948,321 B2 | 2/2015 | Eliaz et al. |
| 8,972,836 B2 | 3/2015 | Eliaz |
| 8,976,853 B2 | 3/2015 | Eliaz |
| 8,976,911 B2 | 3/2015 | Eliaz |
| 8,982,984 B2 | 3/2015 | Eliaz |
| 8,989,249 B2 | 3/2015 | Zerbe et al. |
| 9,003,258 B2 | 4/2015 | Eliaz |
| 2001/0008542 A1 | 7/2001 | Wiebke et al. |
| 2002/0012404 A1* | 1/2002 | Ahn ........................ 375/297 |
| 2002/0016938 A1 | 2/2002 | Starr |
| 2002/0123318 A1 | 9/2002 | Lagarrigue |
| 2002/0150065 A1 | 10/2002 | Ponnekanti |
| 2002/0150184 A1 | 10/2002 | Hafeez et al. |
| 2002/0172297 A1 | 11/2002 | Ouchi et al. |
| 2003/0016741 A1 | 1/2003 | Sasson et al. |
| 2003/0132814 A1 | 7/2003 | Nyberg |
| 2003/0135809 A1 | 7/2003 | Kim |
| 2003/0210352 A1 | 11/2003 | Fitzsimmons et al. |
| 2004/0009783 A1 | 1/2004 | Miyoshi |
| 2004/0037374 A1 | 2/2004 | Gonikberg |
| 2004/0081259 A1 | 4/2004 | Ammer et al. |
| 2004/0086276 A1 | 5/2004 | Lenosky |
| 2004/0120409 A1 | 6/2004 | Yasotharan et al. |
| 2004/0142666 A1 | 7/2004 | Creigh et al. |
| 2004/0170228 A1 | 9/2004 | Vadde |
| 2004/0174937 A1 | 9/2004 | Ungerboeck |
| 2004/0203458 A1 | 10/2004 | Nigra |
| 2004/0227570 A1 | 11/2004 | Jackson et al. |
| 2004/0240578 A1 | 12/2004 | Thesling |
| 2004/0257955 A1 | 12/2004 | Yamanaka |
| 2005/0032472 A1 | 2/2005 | Jiang |
| 2005/0047517 A1 | 3/2005 | Georgios et al. |
| 2005/0089125 A1 | 4/2005 | Zhidkov |
| 2005/0123077 A1 | 6/2005 | Kim |
| 2005/0135472 A1 | 6/2005 | Higashino |
| 2005/0163252 A1 | 7/2005 | McCallister et al. |
| 2005/0193318 A1 | 9/2005 | Okumura |
| 2005/0220218 A1 | 10/2005 | Jensen et al. |
| 2005/0265470 A1 | 12/2005 | Kishigami et al. |
| 2005/0276317 A1 | 12/2005 | Jeong et al. |
| 2006/0067396 A1 | 3/2006 | Christensen |
| 2006/0109780 A1 | 5/2006 | Fechtel |
| 2006/0109935 A1 | 5/2006 | McQueen et al. |
| 2006/0171489 A1 | 8/2006 | Ghosh et al. |
| 2006/0203943 A1 | 9/2006 | Scheim |
| 2006/0239339 A1 | 10/2006 | Brown et al. |
| 2006/0245765 A1 | 11/2006 | Elahmadi et al. |
| 2006/0280113 A1 | 12/2006 | Huo |
| 2007/0047121 A1 | 3/2007 | Eleftheriou et al. |
| 2007/0092017 A1 | 4/2007 | Abedi |
| 2007/0098059 A1 | 5/2007 | Ives et al. |
| 2007/0098090 A1 | 5/2007 | Ma et al. |
| 2007/0098116 A1 | 5/2007 | Kim et al. |
| 2007/0110177 A1 | 5/2007 | Molander et al. |
| 2007/0110191 A1 | 5/2007 | Kim et al. |
| 2007/0127608 A1 | 6/2007 | Scheim et al. |
| 2007/0140330 A1 | 6/2007 | Allpress et al. |
| 2007/0189404 A1 | 8/2007 | Baum et al. |
| 2007/0213087 A1 | 9/2007 | Laroia et al. |
| 2007/0230593 A1 | 10/2007 | Eliaz et al. |
| 2007/0258517 A1 | 11/2007 | Rollings et al. |
| 2007/0291719 A1 | 12/2007 | Demirhan et al. |
| 2008/0002789 A1 | 1/2008 | Jao et al. |
| 2008/0049598 A1 | 2/2008 | Ma et al. |
| 2008/0080644 A1 | 4/2008 | Batruni |
| 2008/0130716 A1 | 6/2008 | Cho et al. |
| 2008/0130788 A1 | 6/2008 | Copeland |
| 2008/0159377 A1 | 7/2008 | Allpress et al. |
| 2008/0207143 A1 | 8/2008 | Skarby et al. |
| 2008/0260985 A1 | 10/2008 | Shirai et al. |
| 2009/0003425 A1 | 1/2009 | Shen et al. |
| 2009/0028234 A1 | 1/2009 | Zhu |
| 2009/0058521 A1 | 3/2009 | Fernandez |
| 2009/0075590 A1 | 3/2009 | Sahinoglu et al. |
| 2009/0086808 A1 | 4/2009 | Liu et al. |
| 2009/0115513 A1 | 5/2009 | Hongo et al. |
| 2009/0122854 A1 | 5/2009 | Zhu et al. |
| 2009/0137212 A1 | 5/2009 | Belotserkovsky |
| 2009/0185612 A1 | 7/2009 | McKown |
| 2009/0213908 A1 | 8/2009 | Bottomley |
| 2009/0220034 A1 | 9/2009 | Ramprashad et al. |
| 2009/0245226 A1 | 10/2009 | Robinson et al. |
| 2009/0245401 A1 | 10/2009 | Chrabieh et al. |
| 2009/0290620 A1 | 11/2009 | Tzannes et al. |
| 2009/0323841 A1 | 12/2009 | Clerckx et al. |
| 2010/0002692 A1 | 1/2010 | Bims |
| 2010/0034253 A1 | 2/2010 | Cohen |
| 2010/0039100 A1 | 2/2010 | Sun et al. |
| 2010/0062705 A1 | 3/2010 | Rajkotia et al. |
| 2010/0074349 A1 | 3/2010 | Hyllander et al. |
| 2010/0158085 A1 | 6/2010 | Khayrallah |
| 2010/0166050 A1 | 7/2010 | Aue |
| 2010/0172309 A1 | 7/2010 | Forenza et al. |
| 2010/0202505 A1 | 8/2010 | Yu et al. |
| 2010/0202507 A1 | 8/2010 | Allpress et al. |
| 2010/0203854 A1 | 8/2010 | Yu et al. |
| 2010/0208774 A1 | 8/2010 | Guess et al. |
| 2010/0208832 A1 | 8/2010 | Lee et al. |
| 2010/0215107 A1 | 8/2010 | Yang |
| 2010/0220825 A1 | 9/2010 | Dubuc et al. |
| 2010/0278288 A1 | 11/2010 | Panicker et al. |
| 2010/0283540 A1 | 11/2010 | Davies |
| 2010/0284481 A1 | 11/2010 | Murakami et al. |
| 2010/0309796 A1 | 12/2010 | Khayrallah |
| 2010/0329325 A1 | 12/2010 | Mobin et al. |
| 2011/0051864 A1 | 3/2011 | Chalia et al. |
| 2011/0064171 A1 | 3/2011 | Huang et al. |
| 2011/0069791 A1 | 3/2011 | He |
| 2011/0074500 A1 | 3/2011 | Bouillet et al. |
| 2011/0074506 A1 | 3/2011 | Kleider et al. |
| 2011/0075745 A1 | 3/2011 | Kleider et al. |
| 2011/0090986 A1 | 4/2011 | Kwon et al. |
| 2011/0134899 A1 | 6/2011 | Jones, IV et al. |
| 2011/0150064 A1 | 6/2011 | Kim et al. |
| 2011/0164492 A1 | 7/2011 | Ma et al. |
| 2011/0170630 A1 | 7/2011 | Silverman et al. |
| 2011/0182329 A1 | 7/2011 | Wehinger |
| 2011/0188550 A1 | 8/2011 | Wajcer et al. |
| 2011/0228869 A1 | 9/2011 | Barsoum et al. |
| 2011/0243266 A1 | 10/2011 | Roh |
| 2011/0249709 A1 | 10/2011 | Shiue et al. |
| 2011/0275338 A1 | 11/2011 | Seshadri et al. |
| 2011/0310823 A1 | 12/2011 | Nam et al. |
| 2011/0310978 A1 | 12/2011 | Wu et al. |
| 2012/0025909 A1 | 2/2012 | Jo |
| 2012/0027132 A1 | 2/2012 | Rouquette |
| 2012/0051464 A1 | 3/2012 | Kamuf et al. |
| 2012/0106617 A1 | 5/2012 | Jao et al. |
| 2012/0120990 A1 | 5/2012 | Koren |
| 2012/0163489 A1 | 6/2012 | Ramakrishnan |
| 2012/0170674 A1 | 7/2012 | Kim |
| 2012/0177138 A1 | 7/2012 | Chrabieh et al. |
| 2012/0207248 A1 | 8/2012 | Ahmed et al. |
| 2012/0269286 A1 | 10/2012 | Huang et al. |
| 2013/0028299 A1 | 1/2013 | Tsai |
| 2013/0044877 A1 | 2/2013 | Liu et al. |

(56) References Cited

U.S. PATENT DOCUMENTS

| | | | |
|---|---|---|---|
| 2013/0077563 A1 | 3/2013 | Kim et al. | |
| 2013/0121257 A1 | 5/2013 | He et al. | |
| 2013/0200950 A1 | 8/2013 | Bai | |
| 2013/0243122 A1* | 9/2013 | Bai | 375/297 |
| 2013/0343480 A1 | 12/2013 | Eliaz | |
| 2013/0343487 A1 | 12/2013 | Eliaz | |
| 2014/0036969 A1* | 2/2014 | Wyville et al. | 375/219 |
| 2014/0036986 A1 | 2/2014 | Eliaz | |
| 2014/0056387 A1 | 2/2014 | Asahina | |
| 2014/0098841 A2 | 4/2014 | Song et al. | |
| 2014/0098907 A1 | 4/2014 | Eliaz | |
| 2014/0098915 A1 | 4/2014 | Eliaz | |
| 2014/0105267 A1 | 4/2014 | Eliaz | |
| 2014/0105268 A1 | 4/2014 | Eliaz | |
| 2014/0105332 A1 | 4/2014 | Eliaz | |
| 2014/0105334 A1 | 4/2014 | Eliaz | |
| 2014/0108892 A1 | 4/2014 | Eliaz | |
| 2014/0133540 A1 | 5/2014 | Eliaz | |
| 2014/0140388 A1 | 5/2014 | Eliaz | |
| 2014/0140446 A1 | 5/2014 | Eliaz | |
| 2014/0146911 A1 | 5/2014 | Eliaz | |
| 2014/0161158 A1 | 6/2014 | Eliaz | |
| 2014/0161170 A1 | 6/2014 | Eliaz | |
| 2014/0198255 A1 | 7/2014 | Kegasawa | |
| 2014/0241477 A1 | 8/2014 | Eliaz | |
| 2014/0247904 A1 | 9/2014 | Eliaz | |
| 2014/0269861 A1 | 9/2014 | Eliaz | |
| 2014/0286459 A1 | 9/2014 | Eliaz | |
| 2014/0294119 A1 | 10/2014 | Sochacki | |
| 2014/0301507 A1 | 10/2014 | Eliaz | |
| 2014/0321525 A1 | 10/2014 | Eliaz | |
| 2014/0328428 A1 | 11/2014 | Eliaz | |
| 2014/0355718 A1 | 12/2014 | Guan et al. | |
| 2014/0376358 A1 | 12/2014 | Eder et al. | |
| 2015/0010108 A1 | 1/2015 | Eliaz | |
| 2015/0049843 A1 | 2/2015 | Reuven et al. | |
| 2015/0063499 A1 | 3/2015 | Eliaz | |
| 2015/0070089 A1 | 3/2015 | Eliaz | |
| 2015/0071389 A1 | 3/2015 | Eliaz | |
| 2015/0078491 A1 | 3/2015 | Eliaz | |

FOREIGN PATENT DOCUMENTS

| | | |
|---|---|---|
| WO | 2007/000495 A1 | 1/2007 |
| WO | 2012/092647 A1 | 7/2012 |
| WO | 2013030815 A1 | 3/2013 |

OTHER PUBLICATIONS

Modulation and Coding for Linear Gaussian Channels, G. David Forney, Jr., and Gottfried Ungerboeck, IEEE Transactions of Information Theory, vol. 44, No. 6, Oct. 1998 pp. 2384-2415 (32 pages).
Intuitive Guide to Principles of Communications, www.complextoreal.com, Inter Symbol Interference (ISI) and Root-raised Cosine (RRC) filtering, (2002), pp. 1-23 (23 pages).
Chan, N., "Partial Response Signaling with a Maximum Likelihood Sequence Estimation Receiver" (1980). Open Access Dissertations and Theses. Paper 2855, (123 pages).
The Viterbi Algorithm, Ryan, M.S. and Nudd, G.R., Department of Computer Science, Univ. of Warwick, Coventry, (1993) (17 pages).
R. A. Gibby and J. W. Smith, "Some extensions of Nyquist's telegraph transmission theory," Bell Syst. Tech. J., vol. 44, pp. 1487-1510, Sep. 1965.
J. E. Mazo and H. J. Landau, "On the minimum distance problem for faster-than-Nyquist signaling," IEEE Trans. Inform. Theory, vol. 34, pp. 1420-1427, Nov. 1988.
D. Hajela, "On computing the minimum distance for faster than Nyquist signaling," IEEE Trans. Inform. Theory, vol. 36, pp. 289-295, Mar. 1990.
G. Ungerboeck, "Adaptive maximum-likelihood receiver for carrier modulated data-transmission systems," IEEE Trans. Commun., vol. 22, No. 5, pp. 624-636, May 1974.
G. D. Forney, Jr., "Maximum-likelihood sequence estimation of digital sequences in the presence of intersymbol interference," IEEE Trans. Inform. Theory, vol. 18, No. 2, pp. 363-378, May 1972.
A. Duel-Hallen and C. Heegard, "Delayed decision-feedback sequence estimation," IEEE Trans. Commun., vol. 37, pp. 428-436, May 1989.
M. V. Eyubog •lu and S. U. Qureshi, "Reduced-state sequence estimation with set partitioning and decision feedback," IEEE Trans. Commun., vol. 36, pp. 13-20, Jan. 1988.
W. H. Gerstacker, F. Obernosterer, R. Meyer, and J. B. Huber, "An efficient method for prefilter computation for reduced-state equalization," Proc. of the 11th IEEE Int. Symp. Personal, Indoor and Mobile Radio Commun. PIMRC, vol. 1, pp. 604-609, London, UK, Sep. 18-21, 2000.
W. H. Gerstacker, F. Obernosterer, R. Meyer, and J. B. Huber, "On prefilter computation for reduced-state equalization," IEEE Trans. Wireless Commun., vol. 1, No. 4, pp. 793-800, Oct. 2002.
Joachim Hagenauer and Peter Hoeher, "A Viterbi algorithm with soft-decision outputs and its applications," in Proc. IEEE Global Telecommunications Conference 1989, Dallas, Texas, pp. 1680-1686,Nov. 1989.
S. Mita, M. M Izumita, N. Doi, and Y. Eto, "Automatic equalizer for digital magnetic recording systems" IEEE Trans. Magn., vol. 25, pp. 3672-3674,1987.
E. Biglieri, E. Chiaberto, G. P. Maccone, and E. Viterbo, "Compensation of nonlinearities in high-density magnetic recording channels," IEEE Trans. Magn., vol. 30, pp. 5079-5086, Nov. 1994.
W. E. Ryan and A. Gutierrez, "Performance of adaptive Volterra equalizers on nonlinear magnetic recording channels," IEEE Trans. Magn., vol. 31, pp. 3054-3056, Nov. 1995.
X. Che, "Nonlinearity measurements and write precompensation studies for a PRML recording channel," IEEE Trans. Magn., vol. 31, pp. 3021-3026, Nov. 1995.
O. E. Agazzi and N. Sheshadri, "On the use of tentative decisions to cancel intersymbol interference and nonlinear distortion (with application to magnetic recording channels)," IEEE Trans. Inform. Theory, vol. 43, pp. 394-408, Mar. 1997.
Miao, George J., Signal Processing for Digital Communications, 2006, Artech House, pp. 375-377.
Xiong, Fuqin. Digital Modulation Techniques, Artech House, 2006, Chapter 9, pp. 447-483.
Faulkner, Michael, "Low-Complex ICI Cancellation for Improving Doppler Performance in OFDM Systems", Center for Telecommunication and Microelectronics, 1-4244-0063-5/06/$2000 (c) 2006 IEEE. (5 pgs).
Stefano Tomasin, et al. "Iterative Interference Cancellation and Channel Estimation for Mobile OFDM", IEEE Transactions on Wireless Communications, vol. 4, No. 1, Jan. 2005, pp. 238-245.
Int'l Search Report and Written Opinion for PCT/IB2013/01866 dated Mar. 21, 2014.
Int'l Search Report and Written Opinion for PCT/IB2013/001923 dated Mar. 21, 2014.
Int'l Search Report and Written Opinion for PCT/IB2013/001878 dated Mar. 21, 2014.
Int'l Search Report and Written Opinion for PCT/IB2013/002383 dated Mar. 21, 2014.
Int'l Search Report and Written Opinion for PCT/IB2013/01860 dated Mar. 21, 2014.
Int'l Search Report and Written Opinion for PCT/IB2013/01970 dated Mar. 27, 2014.
Int'l Search Report and Written Opinion for PCT/IB2013/01930 dated May 15, 2014.
Int'l Search Report and Written Opinion for PCT/IB2013/02081 dated May 22, 2014.
Al-Dhahir, Naofal et al., "MMSE Decision-Feedback Equalizers: Finite-Length Results" IEEE Transactions on Information Theory, vol. 41, No. 4, Jul. 1995.
Cioffi, John M. et al., "MMSE Decision-Feedback Equalizers and Coding—Park I: Equalization Results" IEEE Transactions onCommunications, vol. 43, No. 10, Oct. 1995.
Eyuboglu, M. Vedat et al., "Reduced-State Sequence Estimation with Set Partitioning and Decision Feedback" IEEE Transactions onCommunications, vol. 36, No. 1, Jan. 1988.

(56) References Cited

OTHER PUBLICATIONS

Khaled M. Gharaibeh, Nonlinear Distortion in Wireless Systems, 2011, John Wiley & Sons, 2nd Edition, chapter 3, pp. 59-81.
Forney, G. David Jr., "Coset Codes—Part I: Introduction and Geometrical Classification" IEEE Transactions on Information Theory, vol. 34, No. 5, Sep. 1988.
Prlja, Adnan et al., "Receivers for Faster-than-Nyquist Signaling with and Without Turbo Equalization".
Int'l Search Report and Written Opinion for PCT/IB2014/002449 dated Mar. 12, 2015.
Digital predistortion of power amplifiers for wireless applications (Doctoral dissertation, Georgia Institute of Technology). Retrieved from the internet <http://http://202.28.199.34/multim/3126235.pdf> Ding, L. Mar. 31, 2005.
Digital predistortion for power amplifiers using separable functions. Signal Processing, IEEE Transactions on, 58(8), 4121-4130. Retrieved from the internet </http://arxiv.org/ftp/arxiv/papers/1306/1306.0037.pdf> Jiang, H., & Wilford, P.A. Aug. 8, 2010.
Digital predistortion linearization methods for RF power amplifiers. Teknillinen korkeakoulu. Retrieved from the Internet <http://lib.tkk.fi/Diss/2008/isbn9789512295463/isbn9789512295463.pdf> Teikari I. Sep. 30, 2008.
Kayhan, F., et al., Joint Signal-Labeling Optimization for Pragmatic Capacity under Peak-Power Constraint, 978-1-4244-5637, 2010.
Kayhan, F., et al., Constellation Design for Transmission over Non-linear Satellite Channels, Oct. 5, 2012.
Kayhan, F., et al., Signal and Labeling Optimization for Non-Linear and Phase Noise Channels, Department of Electronics and Telecommunications.
Liu, N. et al., Iterative intersymbol interference cancellation in vestigial sideband Nyquist-subcarrier modulation system. Nov. 2014, Optical Engineering, vol. 53(11) 116109.
Han, H., et al. Simultaneous Predistortio and nonlinear Detection for nonlinearly Distorted OFDM Signals.
Singla, R., et al. Digital predistortion of power amplifiers using look-up table method with memory effects for LTE wireless systems, Journ. on Wireless Communications and Networking 2012:330 http:jwcn.eurasipjournals.com/content/2012/1/330.

* cited by examiner

ADAPTIVE NON-LINEAR MODEL FOR HIGHLY-SPECTRALLY-EFFICIENT COMMUNICATIONS

CLAIM OF PRIORITY

This patent application is a continuation of U.S. patent application Ser. No. 14/047,328 filed on Oct. 7, 2013 (now U.S. Pat. No. 8,824,611), which is a continuation of U.S. patent application Ser. No. 13/755,050 filed on Jan. 31, 2013 (now U.S. Pat. No. 8,553,821), which in turn, claims priority to U.S. Provisional Patent Application Ser. No. 61/662,085 titled "Apparatus and Method for Efficient Utilization of Bandwidth" and filed on Jun. 20, 2012, now expired. This patent application is also a non-provisional of U.S. Provisional Patent Application Ser. No. 61/726,099 titled "Modulation Scheme Based on Partial Response" and filed on Nov. 14, 2012, now expired, U.S. Provisional Patent Application Ser. No. 61/729,774 titled "Modulation Scheme Based on Partial Response" and filed on Nov. 26, 2012, now expired; and U.S. Provisional Patent Application Ser. No. 61/747,132 titled "Modulation Scheme Based on Partial Response" and filed on Dec. 28, 2012, now expired.

This application also makes reference to:
U.S. Pat. No. 8,582,637;
U.S. patent application Ser. No. 13/754,998 filed on Jan. 31, 2013;
U.S. Pat. No. 8,599,914; and
U.S. Pat. No. 8,605,832.

Each of the above stated applications is hereby incorporated herein by reference in its entirety.

FIELD

Certain embodiments of the disclosure relate to communication systems. More specifically, certain embodiments of the disclosure relate to a method and system for an adaptive non-linear model for highly-spectrally-efficient communications.

BACKGROUND

Existing communications methods and systems are overly power hungry and/or spectrally inefficient. Complex linear modulation schemes such as, for example, quadrature amplitude modulation (QAM), are used vastly in wireless and non-wireless communications. However, performance of such modulation schemes degrades in the presence of phase noise and non-linear distortion associated with the communication channel. Some of these modulation schemes may perform, for example, 4-5 dB below the Shannon capacity bound in the case of severe phase noise. As higher-order modulation is needed to drive more throughput, the result may be a throughput that is even further away from the Shannon capacity limit. That is, the gap between desired spectral efficiency and actual spectral efficiency may actually increase with increasing QAM order. In addition, higher-order modulation may also be increasingly sensitive to non-linear distortion.

Further limitations and disadvantages of conventional and traditional approaches will become apparent to one of skill in the art, through comparison of such systems with the present disclosure as set forth in the remainder of the present application with reference to the drawings.

BRIEF SUMMARY OF THE DISCLOSURE

Aspects of the present disclosure are directed to a method and system for an adaptive non-linear model for highly-spectrally-efficient communications, substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

DETAILED DESCRIPTION

Figure 1:
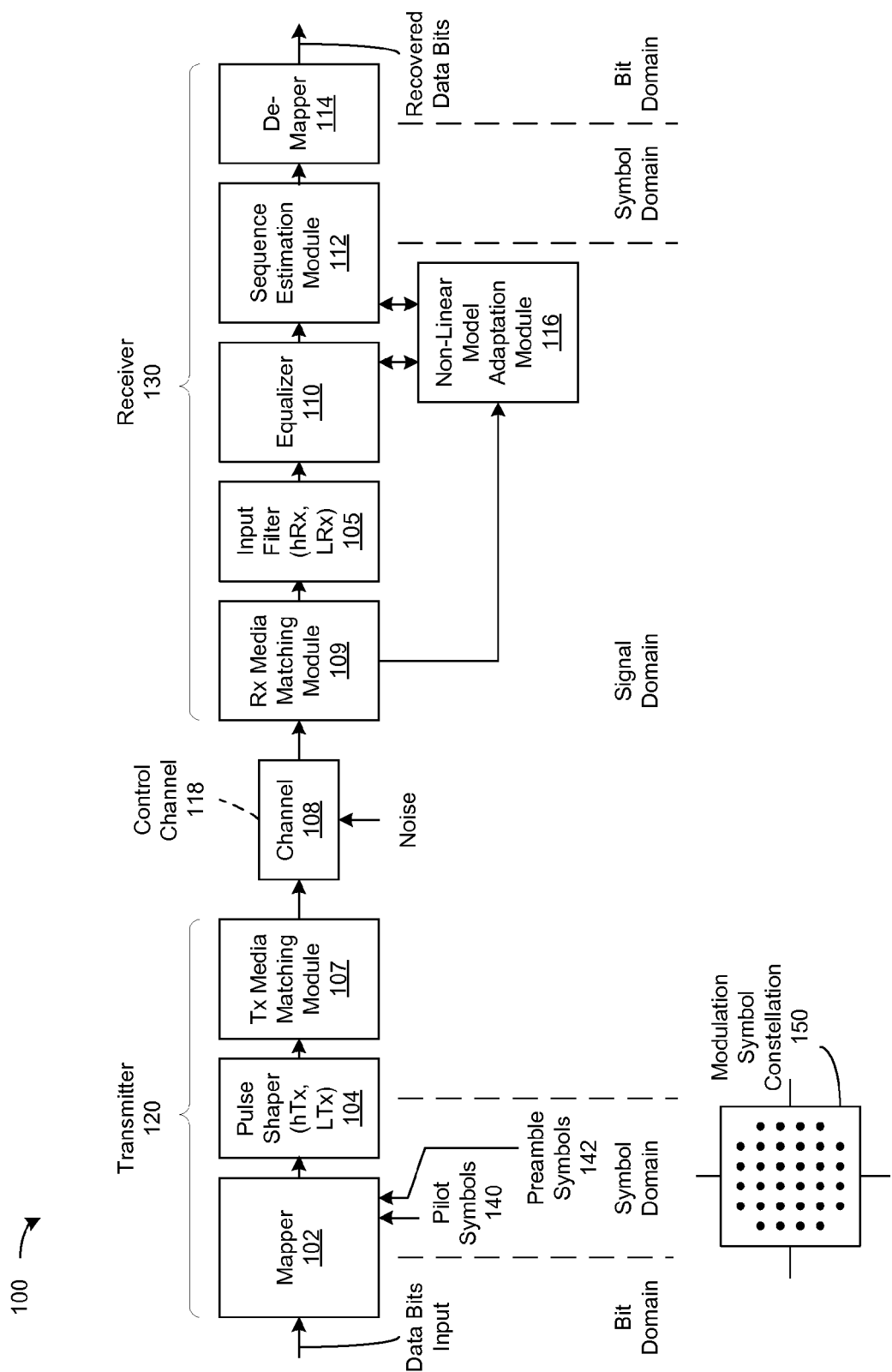
FIG. 1 is a block diagram illustrating an example communication system, in accordance with an embodiment of the disclosure.

As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, a device/module/circuitry/etc. is "operable" to perform a function whenever the device/module/circuitry/etc. comprises the necessary hardware and code (if any is necessary) to perform the function, regardless of whether performance of the function is disabled, or not enabled, by some user-configurable setting.

Certain embodiments of the disclosure can be found in a method and system for an adaptive non-linear model for highly-spectrally-efficient communications. In various embodiments of the disclosure, a receiver in a communication system may be operable to generate estimates of transmitted symbols using a sequence estimation process that may incorporate a non-linear model. The non-linear model may be adapted by the receiver based on particular communication information that may be indicative of non-linearity experienced by the transmitted symbols. The receiver may be operable to generate, via the sequence estimation process that may incorporate the non-linear model, a reconstructed signal from the estimates of the transmitted symbols. The reconstructed signal may correspond to a transmitted inter-symbol-correlated (ISC) signal such as a partial response signal. The receiver may be operable to adapt the non-linear model based on values of an error signal generated from the reconstructed signal, and the values of the error signal may be generated from a portion of the generated estimates that may correspond to known symbols and/or information symbols. In this regard, the known symbols may comprise pilot symbols and/or preamble symbols. In some instances, the receiver may be operable to adapt the non-linear model based on values of an error signal generated from the reconstructed signal, where the values of the error signal may be generated from a portion of the generated estimates that may correspond to both known symbols and information symbols. In this regard, the values of the error signal corresponding to the known symbols may be given more weight in an adaptation algorithm, and the values of the error signal corresponding to the information symbols may be given less weight in the adaptation algorithm.

In an example embodiment of the disclosure, the particular communication information may comprise one or more of the following: a power level at which the transmitted symbols were transmitted, a condition of a channel via which the transmitted symbols were received by the receiver, a configuration of modulation used in transmitting the transmitted symbols, a performance indicator measured in the receiver, a received signal power level, a frequency band of the channel via which the transmitted symbols were received, and a temperature measurement. In this regard, the configuration of modulation may comprise, for example, one or more of the following: bit rate, symbol rate, modulation order, modulation type, coding rate and pilot symbols rate. The transmitted power level may be determined, for example, using an adaptive transmit power control (ATPC) algorithm and/or protocol. The adapting may be performed by the receiver in response to measuring the performance indicator and determining that the measured performance indicator is below a threshold, for example. How often the adapting may be performed may also be determined based on the particular communication information.

In an example embodiment of the disclosure, the receiver may be operable to adapt the non-linear model continuously at a certain configurable rate that may be faster enough comparing to a non-linear behavior variation rate. The receiver may be operable to receive at least a portion of the particular communication information via a control channel between a transmitter and the receiver. A bandwidth (BW) of the control channel may be determined based on the particular communication information, for example. To save the BW of the control channel, the receiver may be operable to receive indications of transmitted power level changes, indications of modulation type changes and/or indications of modulation order changes via, for example, an ATPC process or an adaptive code and modulation (ACM) process.

FIG. 1 is a block diagram illustrating an example communication system, in accordance with an embodiment of the disclosure. Referring to FIG. 1, there is shown a communication system 100. The communication system 100 may comprise a transmitter 120, a communication channel 108 and a receiver 130. The transmitter 120 may comprise, for example, a mapper 102 and a Tx media matching module 107. The receiver 130 may comprise, for example, an Rx media matching module 109, an equalizer 110, a sequence estimation module 112, a non-linear model adaptation module 116 and a de-mapper 114. A total partial response filtering function may be split between the transmitter 120 and the receiver 130. In this regard, the transmitter 120 may comprise a pulse shaper 104 and the receiver 130 may comprise an input filter 105. The total partial response filtering function may be split between the pulse shaper 104 and the input filter 105. In an example embodiment of the disclosure, other components such as, for example, a forward error correction (FEC) encoder in the transmitter 120, an interleaver in the transmitter 120, a timing recovery module in the receiver 130, a de-interleaver in the receiver 130, and/or a FEC decoder in the receiver 130 may also be optionally included without departing from the spirit and scope of various embodiments of the disclosure.

The mapper 102 may comprise suitable logic, circuitry, interfaces and/or code that may be operable to input data bits and generate symbols according to, for example, a linear modulation scheme such as a quadrature amplitude modulation (QAM). In this regard, an M-QAM modulation scheme may comprise a total of M symbols in a QAM symbol constellation over an I-Q plane (M is a positive integer). For example, 32-QAM may comprise a total of 32 symbols in the 32-QAM symbol constellation. A modulation symbol constellation 150 is also illustrated in FIG. 1. Although M-QAM is used for illustration in this disclosure, aspects of this disclosure are applicable to any modulation scheme (e.g., amplitude shift keying (ASK), phase shift keying (PSK), frequency shift keying (FSK), etc.). Additionally, points of the M-QAM constellation may be regularly spaced ("on-grid") or irregularly spaced ("off-grid"). In an example embodiment of the disclosure, the mapper 102 may be operable to insert, periodically and/or on an event-driven basis, a plurality of known symbols, such as pilot symbols 140 and/or preamble symbols 142, into generated symbol sequence. For example, one or two pilot symbols 140 may be inserted every forty information symbols in the generated symbol sequence. For example, thirty-two preamble symbols 142 may be inserted every ten-thousand information symbols. The pilot symbols 140 and/or the preamble symbols 142 may be utilized to train or adapt a non-linear model of a signal received by the receiver 130.

The pulse shaper 104 may comprise suitable logic, circuitry, interfaces and/or code that may be operable to adjust the waveform of a signal received from the mapper 102 such that the waveform of a resulting signal complies with the spectral requirements of a communication channel such as the channel 108. The spectral requirements may be referred to as the "spectral mask" and may be established by a regulatory body (e.g., the Federal Communications Commission in the United States or the European Telecommunications Standards Institute) and/or a standard body (e.g., Third Generation Partnership Project) that governs the communication channels and/or standards in use.

The input filter 105 may comprise suitable logic, circuitry, interfaces and/or code that may be operable to adjust the waveform of the signal received via the channel 108 to generate a signal for further processing in the receiver 130.

Each of the pulse shaper 104 and the input filter 105 may comprise, for example, an infinite impulse response (IIR) and/or a finite impulse response (FIR) filter. The number of taps in the pulse shaper 104 is designated LTx and the number of taps in the input filter 105 is designated LRx. The impulse response of the pulse shaper 104 is denoted herein as hTx and the impulse response of the input filter 105 is denoted herein as hTRx.

In an example embodiment of the disclosure, in order to improve tolerance of non-linearity, the pulse shaper 104 and the input filter 105 may be configured such that each of the output signal of the pulse shaper 104 and the output signal of the input filter 105 intentionally has a substantial amount of inter-symbol interference (ISI). In this regard, the ISI is therefore a controlled ISI. Accordingly, the pulse shaper 104 may be referred to as a partial response pulse shaping filter, and the resulting (output) signals of the pulse shaper 104 and the input filter 105 may be referred to as partial response signals or as residing in the partial response domain. The number of the taps and/or the values of the tap coefficients of the input filter 105 may be designed such that it is intentionally non-optimal in terms of noise in order to improve the tolerance of non-linearity. In this regard, the pulse shaper 104 and/or the input filter 105 in the system 100 may offer superior performance in the presence of non-linearity as compared to, for example, a conventional near zero positive ISI pulse shaping filter such as a raised cosine (RC) pulse shaping filter or a root-raised cosine (RRC) pulse shaping filter.

It should be noted that a partial response signal (or signals in the "partial response domain") is just one example of a type of signal for which there is correlation among symbols of the signal (referred to herein as "inter-symbol-correlated (ISC) signals"). Such ISC signals are in contrast to zero (or near-zero) ISI signals generated by, for example, raised-cosine (RC) or root-raised-cosine (RRC) filtering. For simplicity of illustration, this disclosure focuses on partial response signals generated via partial response filtering. Nevertheless, aspects of this disclosure are applicable to other ISC signals such as, for example, signals generated via matrix multiplication (e.g., lattice coding), and signals generated via decimation below the Nyquist frequency (where aliasing creates correlation among symbols).

A "total partial response (h)" may be equal to the convolution of hTx and hRx, and, thus, the "total partial response length (L)" may be equal to LTx+LRx−1. L may, however, be chosen to be less than LTx+LRx−1 where, for example, one or more taps of the pulse shaper 104 and/or the input filter 105 are below a determined level. Reducing L may reduce decoding complexity of a sequence estimation process in the receiver 130. This tradeoff may be optimized during the design of the pulse shaper 104 and the input filter 105 in the system 100.

The Tx media matching module 107 may comprise suitable logic, circuitry, interfaces and/or code that may be operable to transform the partial response signal outputted by the pulse shaper 104 to an appropriate signal needed to drive the media in the channel 108. For example, the Tx media matching module 107 may comprise a power amplifier, a radio frequency (RF) up-converter, an optical transceiver for optical application, and/or other transformation device which may be required for propagating over the media.

The Rx media matching module 109 may comprise suitable logic, circuitry, interfaces and/or code that may be operable to convert the signal coming from the media in the channel 108 to baseband signal for processing or demodulating. For example, the Rx media matching module 109 may comprise a power amplifier, a radio frequency (RF) down-converter, an optical transceiver for optical application, and/or other transformation device.

The channel 108 may comprise suitable logic, circuitry, device, interfaces and/or code that may be operable to transmit signals from the transmitter 120 to the receiver 130. The channel 108 may comprise a wired, wireless and/or optical communication medium. The channel 108 may comprise noise such as, for example, additive white Gaussian noise (AWGN). The channel 108 may also introduce distortions such as multipath and fading. In an example embodiment of the disclosure, signals transmitted over the channel 108 may include distortion such as, for example, phase noise and/or non-linear distortion. In this regard, for example, the channel 108 may receive signals from the transmitter 120 via the Tx media matching module 107. The receiver 130 may receive signals from the channel 108 via the Rx media matching module 109. Both the Tx media matching module 107 and the Rx media matching module 109 may introduce distortion such as phase noise and non-linear distortion (and/or other non-idealities) caused by, for example, limited dynamic range of components. For example, in radio applications, frequency sources may be needed for up-converting the partial response signal outputted by the pulse shaper 104 from baseband to radio frequency (RF). The frequency sources may introduce phase noise which may distort the phase of the modulated signal. Non-linear distortion (e.g., $3^{rd}$ order) may be generated by elements such as, for example, mixers, power amplifiers, variable attenuators and/or baseband analog amplifiers. In an example embodiment of the disclosure, the channel 108 may comprise a control channel 118 (e.g., an in-band, or out-of-band control channel) which may be used to communicate, for example, at least a portion of particular communication information related to, or indicative of, non-linearity (and thus may be used by the non-linear model adaptation module 116).

The equalizer 110 may comprise suitable logic, circuitry, interfaces and/or code that may be operable to perform equalization functions for the receiver 130. The equalizer 110 may be operable to process a signal received by the equalizer 110 to reduce, for example, ISI caused by the channel 108 between the transmitter 120 and the receiver 130. In an example embodiment of this disclosure, the input signal of the equalizer 110 may be an ISC signal such as a partial response signal received via the channel 108. In this regard, the output signal of the equalizer 110 may be a partial response signal where the ISI left in the output signal may be primarily the result of the pulse shaper 104 and/or the input filter 105 (there may be some residual ISI from multipath, for example, due to use of a least-mean-square (LMS) approach in the equalizer 110). In an example embodiment of the disclosure, the equalizer 110 may be adapted based on an error signal that may be generated in reference to a reconstructed signal (e.g., a reconstructed partial response signal) generated by the sequence estimation module 112.

The sequence estimation module 112 may comprise suitable logic, circuitry, interfaces and/or code that may be operable to perform sequence estimation functions for the receiver 130. An output of the sequence estimation module 112 may be a best estimation (estimated symbol) as to the value of a corresponding transmitted symbol (and/or the corresponding transmitted information bits) generated by the mapper 102 in the transmitter 120. The estimated values may comprise soft-decision estimates, hard-decision estimates, or both. In an example embodiment of the disclosure, a sequence estimation process may incorporate a non-linear model of the signal received by the receiver 130. The non-linear model may be used to overcome non-linear distortion such that an approximation of the non-linearity generated in the transmitter 120 (e.g., by a power amplifier), in the channel 108, and/or in the module 109 (e.g., by a mixer) may be applied during the sequence estimation process in the sequence estimation module 112. The sequence estimation process may also comprise generating a reconstructed signal based on, for example, convolution of the generated symbols (estimated symbols) with taps information associated with the pulse shaper 104 and/or the input filter 105. The taps information associated with the pulse shaper 104 and/or the input filter 105 may be presented, for example, in the form of L (where LTx<=L<=(LTx+LRx−1)) tap coefficients corresponding to the total partial response h, according to the LTx tap coefficients of the pulse shaper 104 and the LRx tap coefficients of the input filter 105. The generated reconstructed signal may then be used as a reference signal to generate an error signal for the equalizer 110.

The non-linear model adaptation module 116 may comprise suitable logic, circuitry, interfaces and/or code that may be operable to perform non-linear model adaptation functions for the receiver 130. Non-linearity introduced to a received signal may be dependent on, for example, power level at the input and output of a non-linear device such as a power amplifier in the Tx media matching module 107, channel conditions, power level at the input and output of the Rx media matching module 109, and/or other causes. In case of dynamic channel conditions or variable modulation configuration (e.g., bit rate, symbol rate, modulation type), non-linearity distortion of the received signal may vary dynamically. In such instances, the non-linear model may need to be adapted or updated dynamically. In an example embodiment of the disclosure, the non-linear model adaptation module 116 may be operable to dynamically adapt the non-linear model which may be incorporated in the sequence estimation process.

The de-mapper 114 may comprise suitable logic, circuitry, interfaces and/or code that may be operable to input estimated symbols from the sequence estimation module 112 and generate recovered data bits according to, for example, a linear modulation scheme such as a M-QAM. Alternatively, or additionally, the de-mapper 114 may generate a soft output for each bit, referred as LLR (Log-Likelihood Ratio). The soft output bits may be used by a soft-decoding forward error corrector (e.g. a low-density parity check (LDPC) decoder). The soft output bits may be generated using, for example, a Soft Output Viterbi Algorithm (SOVA) or similar. Such algorithms may use additional information of the sequence decoding process including metrics levels of dropped paths and/or estimated bit probabilities for generating the LLR, where $$LLR(b) = \log\left(\frac{P_b}{1-P_b}\right),$$

where $P_b$ is the probability that bit b=1.

In operation, the sequence estimation module 112 may be operable to generate symbols (estimated symbols), from a signal received by the receiver 130, using the sequence estimation process which may incorporate the non-linear model for the received signal. The generated symbols may be estimates of transmitted symbols generated by the mapper 102 in the transmitter 120. The generated symbols may comprise information symbols and inserted known symbols such as the pilot symbols 140 and/or the preamble symbols 142. The non-linear model adaptation module 116 may be operable to determine non-linear distortion in the received signal, and may use this determination for adaptation of the non-linear model.

The adaptation of the non-linear model may be based on error signal information which may be generated by, or originate from, the sequence estimation process, and the error signal information may be associated with at least the known symbols. Additionally or alternatively, the adaptation of the non-linear model may be based on particular communication information related to, or indicative of, non-linearity experienced by the transmitted symbols. The particular communication information may comprise, for example, transmitted power level of the signal (e.g., indicated by a value of a power backoff parameter in the Tx media matching module 107), power level at which the signal is received, a condition of the channel 108 (e.g., signal-to-noise ratio (SNR), center frequency of the channel, bandwidth of the channel, etc.), a configuration of modulation, a performance indicator (e.g., bit error rate (BER), symbol error rate (SER), etc.) measured in the receiver 130, a frequency band of the channel 108 and/or a temperature measurement (e.g., measured in or around the transmitter 120 and/or in or around the receiver 130). The configuration of modulation may comprise, for example, bit rate, symbol rate, modulation order (e.g., value of 'M' for M-QAM), modulation type (e.g., QAM, phase shift keying (PSK), frequency shift keying (FSK), amplitude shift keying (ASK), etc.), coding rate and/or pilot symbols rate. The transmitted power level may be determined, for example, using ATPC protocols and/or algorithms.

The non-linear model adaptation module 116 may be operable to receive at least a portion of the particular communication information via the control channel 118 (which may be in-band or out-of-band with the channel over which information symbols and known symbols are communicated). In this regard, a bandwidth (BW) required for the control channel 118 may be based on how often the particular communication information changes (i.e., faster changing particular communication information may demand higher bandwidth for adaptation control traffic) and/or on how often it is desired, or necessary, to adapt the non-linear model in order to maintain a desired level of performance in the receiver 130 (e.g., a desire or need to more frequently adapt the non-linear model in order to maintain a minimum SER may demand higher bandwidth for adaptation control traffic). Accordingly, where lower information symbol throughput can be tolerated in exchange for reduced error rates (e.g., serving static web content), more BW may be allocated for the adaptation control traffic. Conversely, where information throughput is paramount and more errors can be tolerated (e.g., voice over IP), less BW may be allocated for the adaption control traffic.

In an example embodiment of the disclosure, it may be optional that indications of transmitted power level changes, indications of modulation type changes and/or indications of modulation order changes, which are part of an ATPC process or an ACM process, may be used also for the purpose of adapting the non-linear model. In this regard, the non-linear model adaptation module 116 may be operable to receive indications of transmitted power level changes, indications of modulation type changes and/or indications of modulation order changes via, for example, the ATPC process or the ACM process to save the BW of the control channel 118.

Figure 2:
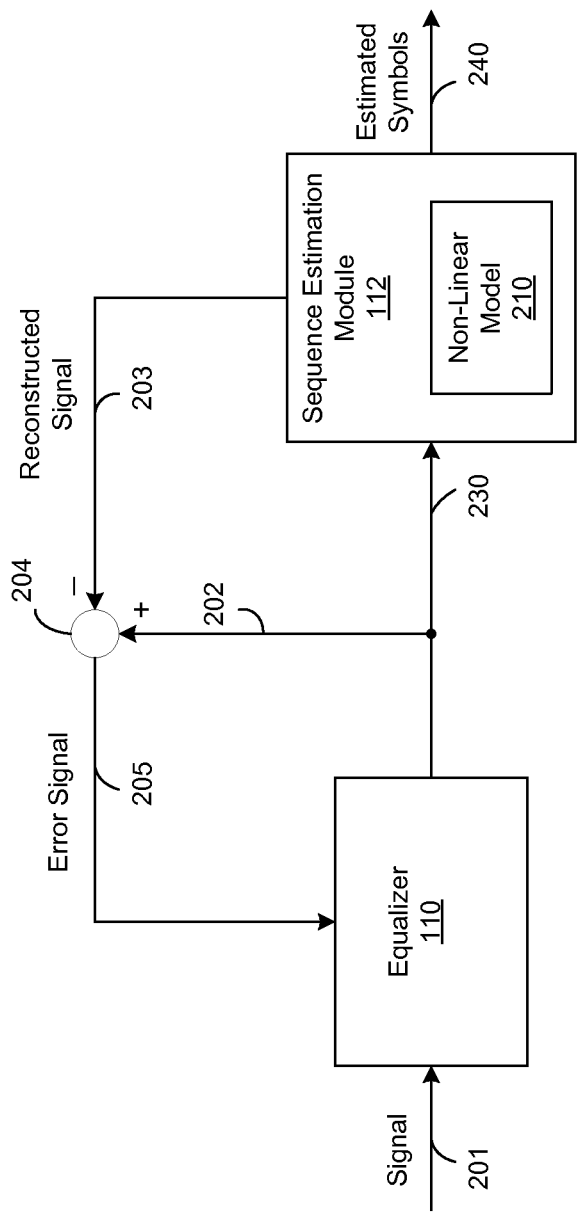
FIG. 2 is a block diagram illustrating an example coupling of an equalizer and a sequence estimation module in a receiver, in accordance with an embodiment of the disclosure.

FIG. 2 is a block diagram illustrating an example coupling of an equalizer and a sequence estimation module in a receiver, in accordance with an embodiment of the disclosure. Referring to FIG. 2, there is shown the equalizer 110 and the sequence estimation module 112. The sequence estimation module 112 may incorporate a non-linear model 210 in a sequence estimation process. The equalizer 110 and the sequence estimation module 112 may be as described with respect to FIG. 1, for example.

In the exemplary embodiment of the disclosure illustrated in FIG. 2, although the equalizer 110 and the sequence estimation module 112 are shown, the disclosure may not be so limited. Other modules (or circuits) such as, for example, a carrier recovery module, a phase adjust module and/or other similar modules may also be optionally included in FIG. 2 without departing from the spirit and scope of various embodiments of the disclosure. For example, the carrier recovery module and/or the phase adjust module may be included for various phase correction or recovery throughout the equalization process and/or the sequence estimation process.

The non-linear model 210 may comprise, for example, a saturated third order polynomial which may be expressed as $$y = \begin{cases} x \cdot (1 - r \cdot e^{j\varphi} \cdot |x|^2), & x < x_{sat} \\ y_{sat}, & x \geq x_{sat} \end{cases} \quad [1]$$

$$y_{sat} = x_{sat} \cdot (1 - r \cdot e^{j\varphi} \cdot |x_{sat}|^2)$$

where, $x_{sat}$ denotes the input saturation value, $y_{sat}$ denotes the output saturation value, x denotes an input of a non-linear device (or group of devices), y denotes an output of the non-linear device (or group of devices), and $\gamma$ may be set according to a desired distortion level (backoff). For example, the non-linear device may be a power amplifier in the Tx media matching module 107. In this regard, the x in equation [1] may denote an input power level of the power amplifier and the y may denote an output power level of the power amplifier. Increased accuracy resulting from the use of a higher-order polynomial for the non-linear model 210 may tradeoff with increased complexity of implementing a higher-order polynomial. As transmitter's non-linearity may be the dominant non-linearity of the communication system 100, modeling the transmitter's non-linearity may be sufficient. In instances where degradation in a receiver's performance is above a certain threshold due to other non-linearities in the system (e.g., non-linearity of the Rx media matching module 109), the non-linear model 210 may take into account such other non-linearities. Equation 1 represents just one example of a non-linearity model that may be used by the module 116 in one or more embodiments of the disclosure. In an example embodiment of the disclosure, adaptation of the non-linearity model may include switching between different non-linearity models (e.g., switching among Rapp model, Cubic polynomial model, Hyperbolic tangent model, Saleh model, Ghorbani model, Voltera series, etc.) and/or adapting parameters of a particular non-linearity model.

In an example operation, the equalizer 110 may be operable to process or equalize a signal 201 to reduce, for example, ISI caused by the channel 108. The equalizer adaptation may be based on, for example, a LMS algorithm. An error signal 205 is fed back to the equalizer 110 to drive the adaptive equalizer 110. The reference for generating the error signal 205 may be, for example, a reconstructed signal 203 coming from the sequence estimation module 112. In an example embodiment of the disclosure, the reconstructed signal 203 may correspond to a transmitted ISC signal such as a partial response signal. In such instances, the signal 201 may be an ISC signal such as a partial response signal. In this regard, the reconstructed signal 203 may be, for example, a reconstructed partial response signal. The error signal 205 is the difference, calculated by a combiner 204, between an output signal 202 of the equalizer 110 and the reconstructed signal 203. Generation of the reconstructed signal 203 may incorporate the non-linear model 210 of the signal 201 and is described below with reference to FIG. 3. An equalized signal 230 may be inputted to the sequence estimation module 112. The sequence estimation module 112 may be operable to generate symbols (estimated symbols) 240, from the signal 230, using the sequence estimation process. The generated symbols 240 may be hard and/or soft estimates of transmitted symbols generated by the mapper 102 in the transmitter 120. An example implementation of the sequence estimation module 112 is described below with reference to FIG. 3.

The non-linear model adaptation module 116 may be operable to adapt or update the non-linear model 210 to compensate, for example, for transmitter output power variations, frequency band variations and/or temperature variations. The adaptation of the non-linear model 210 may be based on error signal information such as the error signal 205. The reliability of a generated value of the error signal 205 may depend on whether the value was generated from estimated symbols 240 corresponding to information symbols, to known symbols (e.g., the pilot symbols 140 and/or the preamble symbols 142), and/or to a combination of known and information symbols. In instances where the corresponding symbols are all known symbols, the error signal 205 may be most reliable (i.e., confidence can be relatively high that differences between signals 203 and 202 are due to inaccuracy of the non-linearity model 210). In instances where the corresponding symbols are entirely information symbols, the error signal 205 may be least reliable (i.e., confidence is relatively low that differences between signals 203 and 202 are due to inaccuracy of the non-linearity model 210). In instances where the corresponding symbols are a mix of known symbols and information symbols, the reliability of the error signal 205 may depend on the proportion of known symbols to information symbols. Accordingly, in one example embodiment, only values of the error signal 205 corresponding to known symbols may be factored into the adaptation of the non-linear model 210. In another example embodiment, values of error signal 205 corresponding to both information symbols and known symbols are used for the adaptation of the non-linear model 210. In such an embodiment, values of the error signal 205 corresponding to known symbols may be weighted more heavily by the adaptation algorithm than values of the error signal 205 corresponding to information symbols. In an example embodiment of the disclosure, how often the adapting is performed by the non-linear model adaptation module 116 may be determined based on the particular communication information (e.g., channel condition, SER, transmitted power level of the signal 201 and/or temperature).

In another embodiment of the disclosure, the non-linear model adaptation module 116 may adapt the non-linear model 210 continuously at a certain configurable rate that is fast enough comparing to the non-linear behavior variation rate thus non-linear model 210 may represent properly the actual non-linear behavior under dynamic changes. The non-linear behavior may vary due to received signal level (RSL) upon channel fading, ATPC, temperature variations at transmitter side, temperature variations of receiver side, and ageing. RSL and ATPC may vary much more rapidly than the temperature and ageing thus the configurable adaptation (or update) rate should consider the fastest dynamical process and the module 116 should be able to update the non-linear model 210 and/or its associated parameters at an appropriate rate. The configurable adaptation rate may vary during operation pending on some receiver quality indicators such as SER, BER, SNR, sequence estimation metrics, error level (e.g., error signal 205) and error variance (e.g., error signal 205), or according to indication received from transmitter side via the control channel 118, where the indication from the transmitter side may reflect changes, for example, in transmitted power, modulation type, etc.

In another embodiment of the disclosure, the sequence estimation module 112 may generate soft symbols which have confidence levels associated with them. In such an embodiment, the weight given to a value of the error signal 205 by the non-linear model adaptation module 116 may be based on the confidence level of the symbol estimates (estimate symbols 240) on which the value of the error signal 205 is based.

Figure 3:
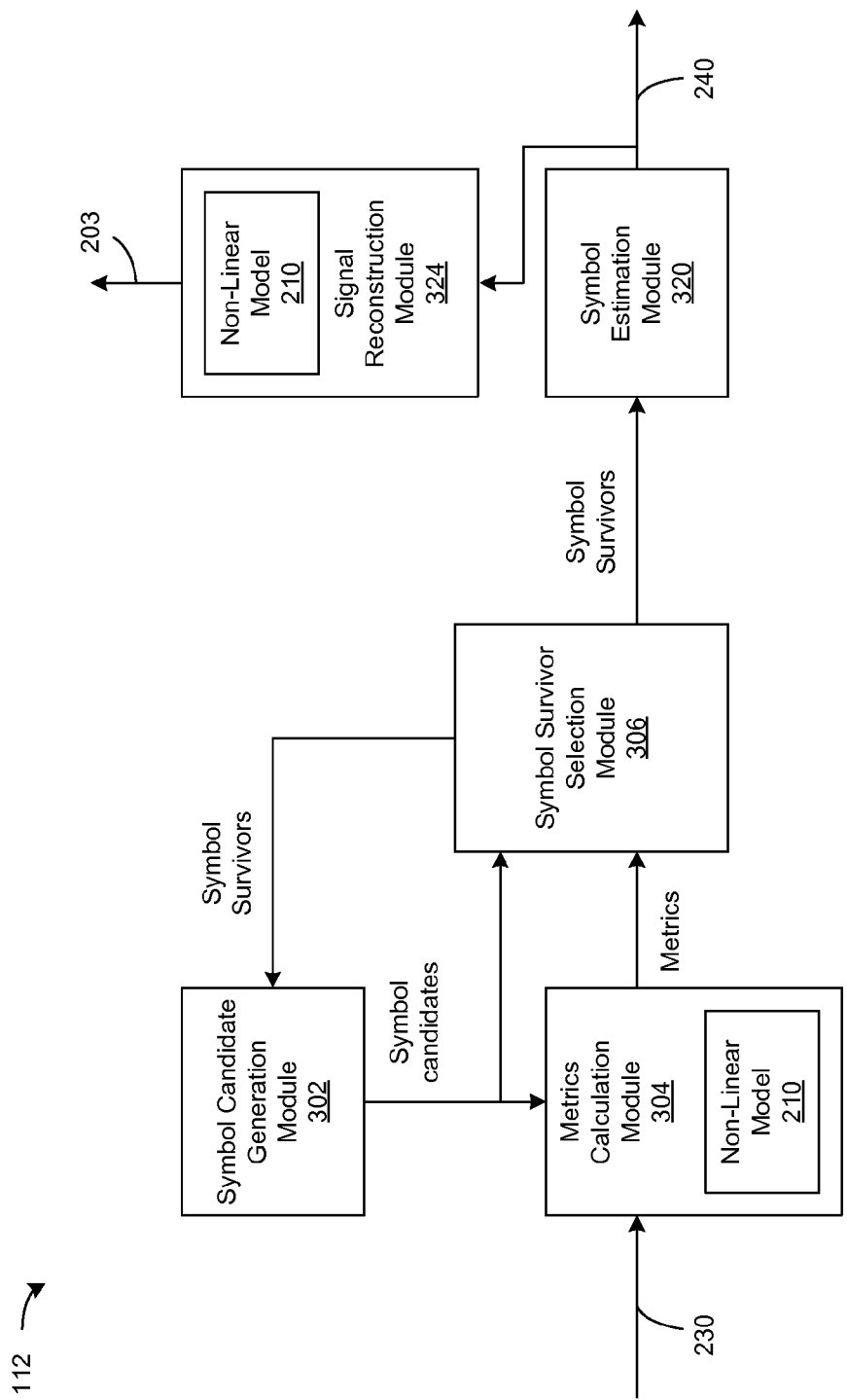
FIG. 3 is a block diagram illustrating an example sequence estimation module incorporating a non-linear model, in accordance with an embodiment of the disclosure.

FIG. 3 is a block diagram illustrating an example sequence estimation module incorporating a non-linear model, in accordance with an embodiment of the disclosure. Referring to FIG. 3, there is shown the sequence estimation module 112.

The sequence estimation module 112 may comprise, for example, a symbol candidate generation module 302, a metrics calculation module 304, a symbol survivor selection module 306, a symbol estimation module 320 and a signal reconstruction module 324. The sequence estimation process described with respect to FIG. 3 is an example only. Many variations of the sequence estimation process may also be possible. The sequence estimation module 112 may be as described with respect to FIGS. 1 and 2, for example.

The metrics calculation module 304 may comprise suitable logic, circuitry, interfaces and/or code that may be operable to generate metrics needed for symbol survivor selections and symbol (including corresponding phase) estimations. Metrics calculations may be executed based on the signal 230 received by the metrics calculation module 304 and symbol candidates generated by the symbol generation module 302. Each symbol candidate may be a vector comprising, for example, Q candidate symbols (Q is a positive integer). Information associated with the taps of the pulse shaper 104 and/or the input filter 105 may also be utilized for the metrics calculation. In an example embodiment of the disclosure, the signal 230 may be an equalized ISC signal such as a partial response signal received from the equalizer 110. The taps information (e.g., number of taps and/or tap coefficients) associated with the pulse shaper 104 and/or the input filter 105 may be used to generate reconstructed partial response signal candidates from the symbol candidates, for example, via convolution. The taps information associated with the pulse shaper 104 and/or the input filter 105 may be presented, for example, in the form of L (where LTx<=L<=(LTx+LRx−1)) tap coefficients corresponding to the total partial response h, according to the LTx tap coefficients of the pulse shaper 104 and the LRx tap coefficients of the input filter 105. Furthermore the non-linear model 210 may be incorporated in the process of generating the reconstructed partial response signal candidates. For example, the non-linear model 210 may be applied to the convolved symbol candidates to generate the reconstructed partial response signal candidates. The metric value for each of the symbol candidates may then be generated based on a cost function (e.g., a squared error function) between the signal 230 and the reconstructed partial response signal candidates. The candidates which have the best metrics level may be selected by the symbol survivor selection module 306 for the next iteration of the sequence estimation process.

The symbol survivor selection module 306 may comprise suitable logic, circuitry, interfaces and/or code that may be operable to perform metrics sorting and selection of a determined number of symbol survivors based on the metrics associated with the symbol candidates. In this regard, for example, one or more candidates which have the lowest metrics level may be selected from among the symbol candidates, as symbol survivors. Each symbol survivor may also be a vector comprising, for example, Q candidate symbols (Q is a positive integer). Each element of each symbol survivor may comprise a soft-decision estimate and/or a hard-decision estimate of a symbol of the signal 230. Besides a newly-detected symbol at a head of the vector, there are (Q−1) symbols in the vector. Some of the (Q−1) symbols could be different than corresponding symbols in a previously-selected symbol survivor (i.e. the sequence estimation may diverge to a different vector). The reliability of the newly-detected symbol may be very low because it may be derived only from the newest signal sample and a first tap of the L taps associated with the pulse shaper 104 and/or the input filter 105, which may have a coefficient that is small in magnitude. The reliability of old symbols toward a tail of the vector may improve along the survived vectors because old symbols are represented by many signal samples (up to effective number of the taps of the total partial response) and thus take advantage of more information. In this regard, the tails (old symbols) of the symbol survivors may converge to the same solution while the head (young symbols) parts of the symbol survivors may be different.

The symbol candidate generation module 302 may comprise suitable logic, circuitry, interfaces and/or code that may be operable to generate symbol candidates from symbol survivors generated from a previous iteration of the sequence estimation process. For example, for M-QAM (M is a positive integer), there are M symbols in the M-QAM symbol constellation (e.g., the modulation symbol constellation 150) over an I-Q plane. In this regard, generation of the symbol candidates may comprise, for example, duplicating (e.g., (M−1) times) each of the symbol survivors (vectors) generated during the previous iteration of the sequence estimation process, shifting each of the resulting M vectors by one symbol position toward the tail of the vector, and then filling each of the M vacant symbol positions (at the head of the vector) with a symbol from among the M possible symbols in the M-QAM symbol constellation (e.g., the modulation symbol constellation 150).

The symbol estimation module 320 may comprise suitable logic, circuitry, interfaces and/or code that may be operable to generate symbols (estimated symbols) 240 based on the symbol survivors received from the symbol survivor selection module 306. In an example embodiment of the disclosure, the symbol estimation module 320 may be operable to generate the symbols 240 based on a best symbol survivor with the lowest metric value. The symbol estimation module 320 may comprise one or more buffers to store one or more symbol survivors. The generated symbols 240 may also be outputted from the symbol estimation module 320 to the signal reconstruction module 324 for generating the reconstructed signal 203.

The signal reconstruction module 324 may comprise suitable logic, circuitry, interfaces and/or code that may be operable to generate the reconstructed signal 203. In an example embodiment of the disclosure, the signal 230 may be an equalized ISC signal such as a partial response signal received from the equalizer 110. The taps information associated with the pulse shaper 104 and/or the input filter 105 (e.g., the L tap coefficients) may be used to generate the reconstructed signal (partial response signal) 203 from the estimated symbols 240, for example, via convolution. In this regard, for example, the non-linear model 210 may be incorporated in the process of generating the reconstructed signal (partial response signal) 203. For example, the non-linear model 210 may be applied to the convolved symbols to generate the reconstructed signal (partial response signal) 203.

In an example operation, the non-linear model 210 may be incorporated in the process of generating the reconstructed signal 203 in the signal reconstruction module 324. An error signal such as the error signal 205 may be derived from the reconstructed signal 203 (see FIG. 2). The error signal 205 may be utilized to drive the adaptive equalizer 110 during an equalization process. By applying the non-linear model 210, the error signal 205 may be more reliable and more accurate even in the case of severe non-linearity, thus the equalizer 110 may converge to the desired solution. The non-linear model 210 may also be incorporated in the process of generating the metrics in the metrics calculation module 304. By applying the non-linear model 210 in the metrics generation may enable the sequence estimation to tolerate the non-linear distortion almost without any degradation.

In an example embodiment of the disclosure, the non-linear model 210 may be adapted or updated dynamically by the non-linear model adaptation module 116. The adaptation of the non-linear model 210 may be based on, for example, values of the error signal information 205 and/or particular communication information indicative of non-linear distortion in the received signal.

Figure 4:
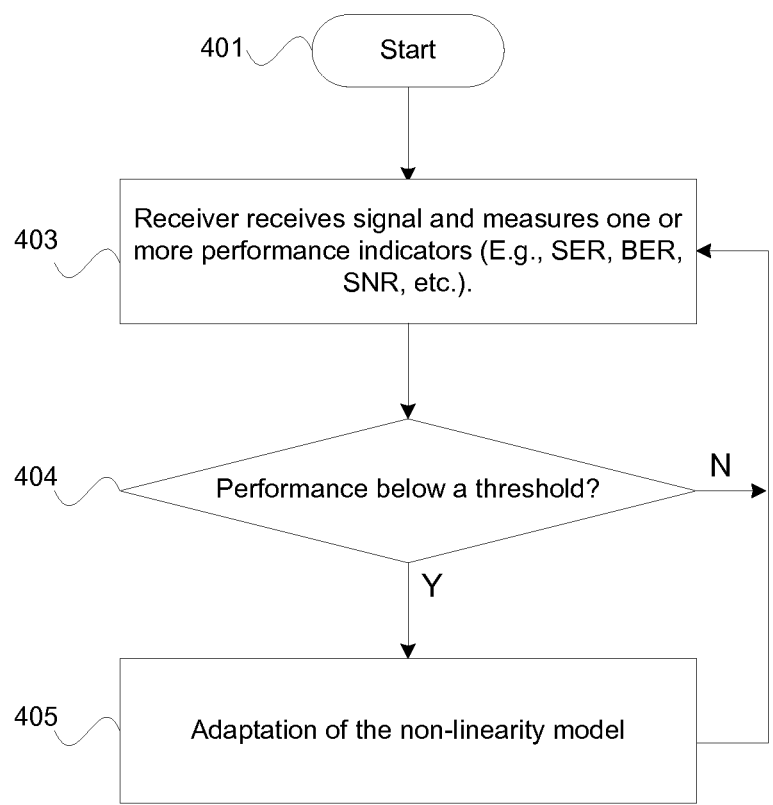
FIG. 4 is a flow chart illustrating example steps for an adaptive non-linear model for highly-spectrally-efficient communications, in accordance with an embodiment of the disclosure.

FIG. 4 is a flow chart illustrating example steps for an adaptive non-linear model for highly-spectrally-efficient communications, in accordance with an embodiment of the disclosure. Referring to FIG. 4, the example steps start at step 401. In step 403, the non-linear model adaptation module 116 in the receiver 130 may be operable to receive a signal and measures one or more performance indicators (e.g., SER, BER, SNR, sequence estimation metrics, error signal variance (e.g., error signal 205), etc.) for the received signal. In step 404, the non-linear model adaptation module 116 determines whether the measured performance indicator is below a determined threshold. The threshold may be, for example, determined based on a selected channel, based on a mode of operation of the receiver 130 (e.g., a lower power mode or a high performance mode), based on a type of information to be received (e.g., quality of service parameters associated with the traffic to be received) and/or any other suitable factors. If the performance indicator is equal to or above the threshold, the steps may return to step 403. If the performance indicator is below the threshold, the steps may advance to step 405. In step 405, adaptation of the non-linear model 210 used by the receiver 130 (e.g., by the sequence estimation module 112) for the received signal may occur. The adaptation may comprise selecting a different model and/or adjusting parameters of a selected model. The adaptation may be based on parameters determined independently by the non-linear model adaptation module 116 and/or communicated by the transmitter 120 via the control channel 118. In an example embodiment, in step 405 the non-linear model adaptation module 116 may signal to the transmitter 120 that performance is poor and/or request the transmitter 120 to send a sequence of known symbols for use in adapting the non-linear model 210. Subsequent to adapting the non-linear model 210, the steps may return to step 403.

Figure 5:
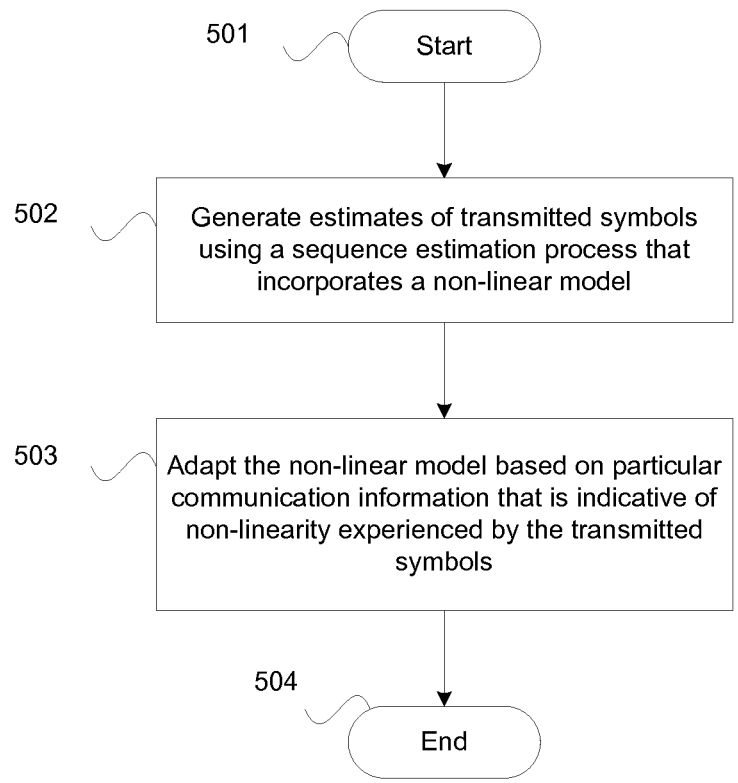
FIG. 5 is a flow chart illustrating example steps for an adaptive non-linear model for highly-spectrally-efficient communications, in accordance with an embodiment of the disclosure.

FIG. 5 is a flow chart illustrating example steps for an adaptive non-linear model for highly-spectrally-efficient communications, in accordance with an embodiment of the disclosure. Referring to FIG. 5, the example steps start at step 501. In step 502, the sequence estimation module 112 in the receiver 130 may be operable to generate estimates (estimated symbols 240) of transmitted symbols using a sequence estimation process that may incorporate a non-linear model 210 of the received signal 201. The transmitted symbols may be generated by the mapper 102 in the transmitter 120. In step 503, the non-linear model adaptation module 116 in the receiver 130 may be operable to adapt the non-linear model 210 based on particular communication information that may be indicative of non-linearity experienced by the transmitted symbols. The adaptation of the non-linear model 210 may comprise selecting new values for one or more parameters of the non-linear model 210 and/or select a new non-linear model. For example, where Eq. 1 is selected as the non-linear model 210, step 503 may comprise determining new value(s) of $x_{sat}$, $y_{sat}$, and/or $\gamma$. The particular communication information may have been communicated to the non-linear model adaptation module 116 via the control channel 118 and/or determined independently by the non-linear model adaptation module 116. The example steps may proceed to the end step 504.

Figure 6:
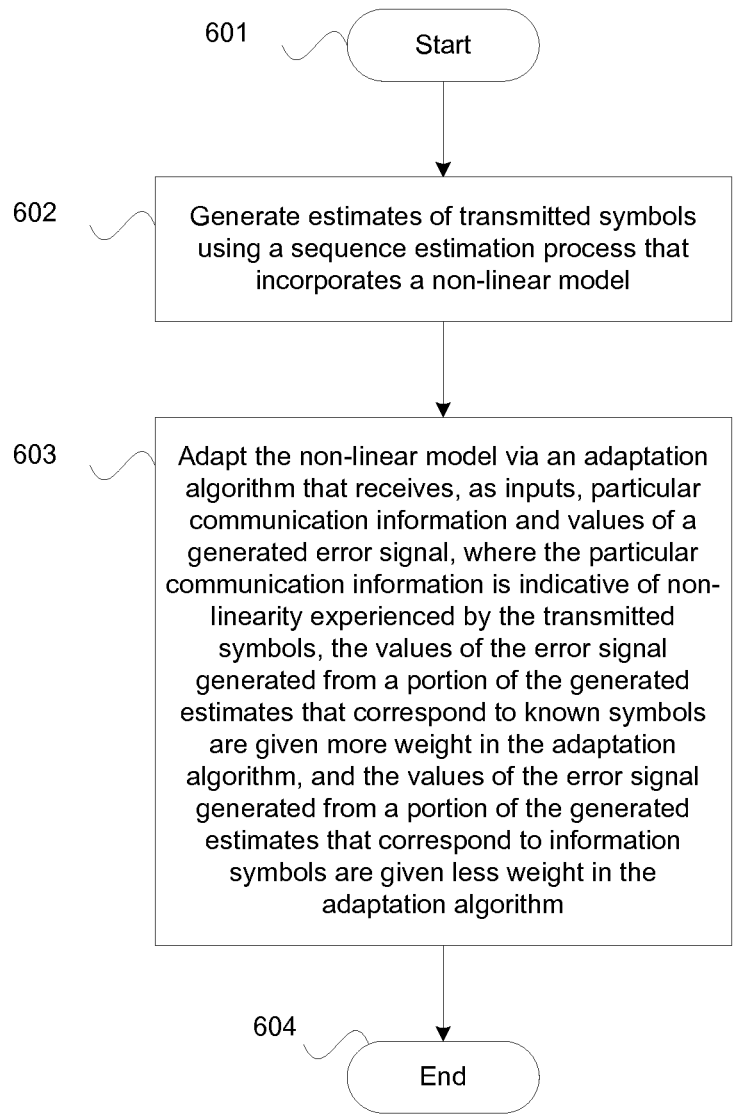
FIG. 6 is a flow chart illustrating example steps for an adaptive non-linear model for highly spectrally efficient communications, in accordance with an embodiment of the disclosure.

FIG. 6 is a flow chart illustrating example steps for an adaptive non-linear model for highly spectrally efficient communications, in accordance with an embodiment of the disclosure. Referring to FIG. 6, the example steps start at step 601. In step 602, the sequence estimation module 112 in the receiver 130 may be operable to generate estimates (estimated symbols 240) of transmitted symbols using a sequence estimation process that may incorporate a non-linear model 210 of the received signal 201. The transmitted symbols may be generated by the mapper 102 in the transmitter 120. The transmitted symbols may comprise information symbols and known symbols (e.g., the pilot symbols 140 and/or the preamble symbols 142). In step 603, the non-linear model adaptation module 116 may be operable to adapt the non-linear model 210 via an adaptation algorithm that may receive, as inputs, particular communication information and values of an error signal 205 generated according to the sequence estimation process, for example. In this regard, the particular communication information may be indicative of non-linearity experienced by the transmitted symbols. The values of the error signal 205 generated from a portion of the generated estimates (estimated symbols 240) that correspond to the known symbols may be given more weight in the adaptation algorithm, and the values of the error signal 205 generated from a portion of the generated estimates (estimated symbols 240) that correspond to the information symbols may be given less weight in the adaptation algorithm. The example steps may proceed to the end step 604.

In various embodiments of the disclosure, a sequence estimation module 112 in a receiver 130 may be operable to generate estimates (estimated symbols 240) of transmitted symbols using a sequence estimation process that may incorporate a non-linear model 210 of a received signal 201. The transmitted symbols may be generated by a mapper 102 in a transmitter 120. The transmitted symbols may comprise information symbols and known symbols (e.g., pilot symbols 140 and/or preamble symbols 142). The non-linear model 210 may be adapted by a non-linear model adaptation module 116 in the receiver 130 based on particular communication information that may be indicative of non-linearity experienced by the transmitted symbols. The sequence estimation module 112 may be operable to generate, via the sequence estimation process that may incorporate the non-linear model 210, a reconstructed signal 203 from the estimates (the estimated symbols 240) of the transmitted symbols. The reconstructed signal 203 may correspond, for example, to a transmitted ISC signal such as a partial response signal. The non-linear model adaptation module 116 may be operable to adapt the non-linear model 210 based on values of an error signal 205 generated from the reconstructed signal 203, and the values of the error signal 205 may be generated from a portion of the generated estimates (the estimated symbols 240) that may correspond to the known symbols (e.g., the pilot symbols 140 and/or the preamble symbols 142) and/or the information symbols. In some instances, the non-linear model adaptation module 116 may be operable to adapt the non-linear model 210 based on values of an error signal 205 generated from the reconstructed signal 203, wherein, the values of the error signal 205 may be generated from a portion of the generated estimates (the estimated symbols 240) that may correspond to both known symbols and information symbols. In this regard, the values of the error signal 205 corresponding to the known symbols may be given more weight in an adaptation algorithm, and the values of the error signal 205 corresponding to the information symbols may be given less weight in the adaptation algorithm.

The particular communication information may comprise one or more of the following: a power level at which the transmitted symbols were transmitted, a condition of a channel 108 via which the transmitted symbols were received by the receiver 130, a configuration of modulation used in transmitting the transmitted symbols, a performance indicator measured by the non-linear model adaptation module 116 in the receiver 130, a received signal power level, a frequency band of the channel 108 via which the transmitted symbols were received, and/or a temperature measurement. In this regard, the configuration of modulation may comprise, for example, one or more of the following: bit rate, symbol rate, modulation order, modulation type, coding rate and pilot symbols rate. The transmitted power level may be determined, for example, using an ATPC algorithm and/or protocol. The adapting may be performed by the non-linear model adaptation module 116 in response to measuring the performance indicator and determining that the measured performance indicator is below a threshold, for example. How often the adapting may be performed may also be determined based on the particular communication information (e.g., channel condition, SER, transmitted power level of the signal 201 and/or temperature).

The non-linear model adaptation module 116 may be operable to adapt the non-linear model 210 continuously at a certain configurable rate that may be faster enough comparing to a non-linear behavior variation rate. The non-linear model adaptation module 116 may be operable to receive at least a portion of the particular communication information via a control channel 118 between the transmitter 120 and the receiver 130. A bandwidth (BW) of the control channel 118 may be determined based on the particular communication information, for example. To save the BW of the control channel 118, the non-linear model adaptation module 116 may be operable to receive indications of transmitted power level changes, indications of modulation type changes and/or indications of modulation order changes via, for example, an ATPC process or an ACM process.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for an adaptive non-linear model for highly-spectrally-efficient communications.

Accordingly, aspects of the present disclosure may be realized in hardware, software, or a combination of hardware and software. Aspects of the present disclosure may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Aspects of the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A receiver comprising:
    a nonlinearity modeling circuit operable to generate a model of nonlinear distortion introduced by a transmitter of a signal received by said receiver, wherein said model of nonlinear distortion is operable to be adapted during operation of said receiver; and
    a sequence estimation circuit operable to:
    generate transmitted symbol decisions for said received signal through comparison of said received signal to a reference signal generated using said model of nonlinear distortion introduced by said transmitter; and
    generate a feedback signal through application of said model of nonlinear distortion introduced by said transmitter to said generated transmitted symbol decisions.

2. The receiver of claim 1, wherein adaptation of said model of nonlinear distortion introduced by a transmitter is based on said feedback signal.

3. The receiver of claim 1, wherein adaptation of said model of nonlinear distortion introduced by said transmitter is based on an indication of transmit power used by said transmitter.

4. The receiver of claim 1, wherein adaptation of said model of nonlinear distortion introduced by said transmitter is based on an order of modulation used by said transmitter for transmission of said received signal.

5. The receiver of claim 1, wherein adaptation of said model of nonlinear distortion introduced by said transmitter is based on strength at which said received signal is received.

6. The receiver of claim 1, wherein adaptation of said model of nonlinear distortion introduced by said transmitter is based on frequency of said received signal.

7. A receiver comprising:
    a nonlinearity modeling circuit operable to generate a model of nonlinear distortion introduced by a transmitter of a signal received by said receiver, wherein:
        said model of nonlinear distortion is operable to be adapted during operation of said receiver; and
        adaptation of said model of nonlinear distortion introduced by said transmitter is based on control traffic communicated by said transmitter; and
    a sequence estimation circuit operable to:
        generate transmitted symbol decisions for said received signal through comparison of said received signal to a reference signal generated using said model of nonlinear distortion introduced by said transmitter.

8. A receiver comprising:
    a nonlinearity modeling circuit operable to generate a model of nonlinear distortion introduced by a transmitter of a signal received by said receiver, wherein:
        said model of nonlinear distortion is operable to be adapted during operation of said receiver; and adaptation of said model of nonlinear distortion introduced by said transmitter is based on a performance indicator measured by said receiver for said received signal; and a sequence estimation circuit operable to:

generate transmitted symbol decisions for said received signal through comparison of said received signal to a reference signal generated using said model of nonlinear distortion introduced by said transmitter.

9. A receiver comprising:

a nonlinearity modeling circuit operable to generate a model of nonlinear distortion introduced by a transmitter of a signal received by said receiver, wherein:

said model of nonlinear distortion is operable to be adapted during operation of said receiver; and adaptation of said model of nonlinear distortion introduced by said transmitter is based on one or both of pilot symbols and preamble symbols of said received signal; and a sequence estimation circuit operable to:

generate transmitted symbol decisions for said received signal through comparison of said received signal to a reference signal generated using said model of nonlinear distortion introduced by said transmitter.

10. A receiver comprising:

front-end circuitry operable to receive a signal via a channel, wherein said received signal is a result of a transmitted sequence of symbols;

nonlinearity modeling circuitry operable to:

generate a model of nonlinear distortion experienced by said received signal; and adjust said model of nonlinear distortion during reception of said received signal; and sequence estimation circuitry operable to:

generate a candidate sequence of symbols;

distort, using said model of nonlinear distortion, said candidate sequence of symbols, said distortion of said candidate sequence of symbols resulting in a reference signal; and determine whether said candidate sequence of symbols is a likely match to said transmitted sequence of symbols based on said reference signal.

11. The receiver of claim 10, wherein said sequence estimation circuit is operable to generate a feedback signal through distortion of a generated symbol decision based on said model of nonlinear distortion.

12. The receiver of claim 11, wherein said adjustment of said model of nonlinear distortion is based on said feedback signal.

13. The receiver of claim 10, wherein said adjustment of said model of nonlinear distortion is based on an indication of transmit power used by said transmitter.

14. The receiver of claim 10, wherein said adjustment of said model of nonlinear distortion is based on an order of modulation used by said transmitter for transmission of said received signal.

15. The receiver of claim 10, wherein said adjustment of said model of nonlinear distortion is based on strength at which said received signal is received.

16. The receiver of claim 10, wherein said adjustment of said model of nonlinear distortion is based on control traffic communicated by said transmitter.

17. The receiver of claim 10, wherein said adjustment of said model of nonlinear distortion is based on a performance indicator measured by said receiver for said received signal.

18. The receiver of claim 10, wherein said adjustment of said model of nonlinear distortion is based on one or both of pilot symbols and preamble symbols of said received signal.

19. The receiver of claim 10, wherein said adjustment of said model of nonlinear distortion is based on frequency of said received signal.

\* \* \* \* \*